United States Patent [19]
Ishikawa et al.

[11] Patent Number: 5,212,011
[45] Date of Patent: May 18, 1993

[54] ADHESIVE TAPE

[75] Inventors: Yuzuru Ishikawa, Tokyo; Tsuneta Ikeda, Saitama; Minoru Nishino, Mitakaishi, all of Japan

[73] Assignee: Sumitomo Chemical Co., Ltd., Osaka, Japan

[21] Appl. No.: 869,120

[22] Filed: Apr. 15, 1992

Related U.S. Application Data

[63] Continuation of Ser. No. 658,458, Feb. 22, 1991, abandoned, which is a continuation of Ser. No. 451,156, Dec. 15, 1989, abandoned.

[30] Foreign Application Priority Data

Dec. 16, 1988 [JP] Japan .................. 63-318738
Apr. 27, 1989 [JP] Japan .................. 1-108100
Oct. 4, 1989 [JP] Japan .................. 1-259766

[51] Int. Cl.$^5$ ................................ B32B 7/12
[52] U.S. Cl. .................... 428/343; 428/167; 428/906
[58] Field of Search ....................... 428/343

[56] References Cited

U.S. PATENT DOCUMENTS

| | | | |
|---|---|---|---|
| 4,139,669 | 2/1979 | Chang | 428/343 X |
| 4,237,889 | 12/1980 | Gobran | 428/343 X |
| 4,397,905 | 8/1983 | Dettmer et al. | 428/343 X |
| 4,781,957 | 11/1988 | Brown et al. | 428/343 X |
| 4,898,762 | 2/1990 | Brown et al. | 428/343 X |

FOREIGN PATENT DOCUMENTS

| | | |
|---|---|---|
| 0255866 | 7/1987 | European Pat. Off. . |
| 2519883 | 1/1982 | France . |
| 50-13306 | 5/1975 | Japan . |
| 51-47907 | 11/1976 | Japan . |
| 57-10153 | 2/1982 | Japan .................. 428/343 |
| 668273 | 3/1948 | United Kingdom . |

Primary Examiner—George F. Lesmes
Assistant Examiner—D. R. Zirker
Attorney, Agent, or Firm—Birch, Stewart, Kolasch & Birch

[57] ABSTRACT

The present invention relates to an adhesive tape which is low in cost and the properties of which such as unwindability, adhesiveness, trimmed clearance, printability, transparency and longitudinal tearing strength are improved without spoiling lateral hand cutting characteristics, wherein a smooth surface is formed on one side of a polyolefin resin base film and an uneven surface is formed on the other side thereof, the latter being coated with an adhesive and having an uneven depth of 0.03–0.30 mm and an uneven interval of 0.5–5.0 mm, the melt index of polyolefin resin being 0.2–20 g/10 min. and a surface wetting tension of the smooth surface of the polyolefin resin base film being less than 30 Dyn/cm and that of the uneven surface being more than 35 Dyn/cm.

2 Claims, 5 Drawing Sheets

ADHESIVE TAPE

This application is a continuation of application Ser. No. 07/658,458 filed on Feb. 22, 1991, now abandoned, which is a continuation of Ser. No. 07/451,156 filed on Dec. 15, 1989 now abandoned.

BACKGROUND OF THE INVENTION

The present invention relates to an adhesive tape which is low in cost and the properties of which such as unwindability, adhesiveness, trimmed clearance, printability and transparency are improved without spoiling hand lateral cutting characteristics and, more particularly, it relates to an adhesive tape having improved longitudinal tearing strength.

Figure 9:
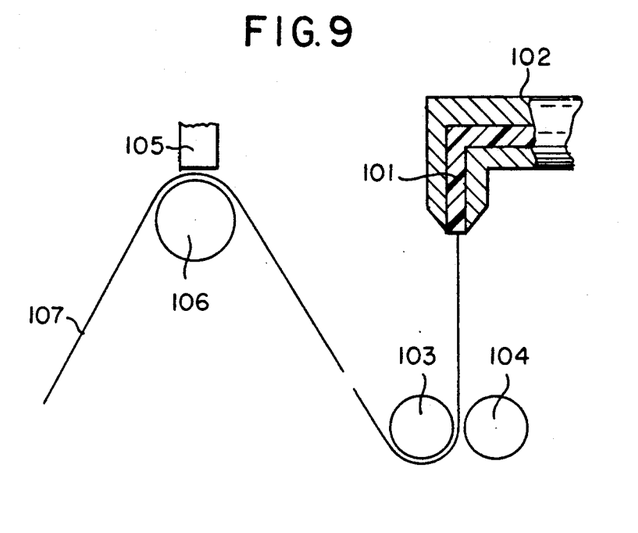
FIG. 9 is a front view illustrating production of a base film of a conventional adhesive tape.

In conventional adhesive tape, as shown in FIG. 9, a molten synthetic resin material 101 is extruded into a sheet by an extruding machine 102, and the sheet is passed through a rubber roll 103 and a drawing roll 104 to form a smooth surface on one side and an uneven surface on the other side and then processed by corona discharge so as to facilitate the coating of an adhesive, thereafter a base film 107 is produced by passing through an electrode 105 and a processing roll 106.

Figure 10:
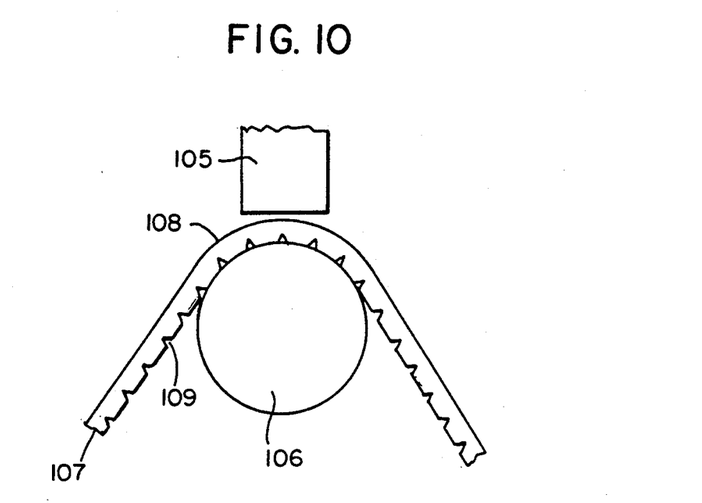
FIG. 10 is an enlarged front view of an essential portion of FIG. 9.

As shown in FIG. 10, the base film 107 passing through the electrode 105 and the processing roll 106 contacts the former at the smooth surface 108 and contacts the latter at the uneven surface 109. The base film 107 thus prepared is coated with an adhesive on the smooth surface 108 to produce the adhesive tape.

Prior art disclosing an adhesive tape, in which an adhesive layer is provided on the smooth surface and the other surface is formed to be uneven, includes Japanese Publication patent No. 13306/1975 entitled "Adhesive Tape" and Japanese Publication Utility Model Patent No. 47907/1976 entitled "Plastic Adhesive Tape".

In the prior art an adhesive tape which is formed in a body by providing a smooth adhesive layer on the smooth surface and forming the other surface to be uneven, exhibits the following disadvantages.

(1) As shown in FIG. 10, in order to improve adhesion of the adhesive on the smooth surface 108 of the base film 107, the smooth surface 108 is processed by corona discharge by discharging from the electrode 105. But the corona discharge is struck through the uneven surface 109. That is, the uneven surface 109 is also partly processed by the corona discharge and susceptible to stick to the adhesives coated on the smooth surface 108 at that partly processed portion, so that the rolled adhesive tape is difficult to unwind and blocking may occur.

(2) When using the adhesive tape, the adhesive layer surface is deformed unevenly by the uneven surface on the rear side, and the adhesive power is inevitably weakened since the adhesive area is reduced.

Figure 11:
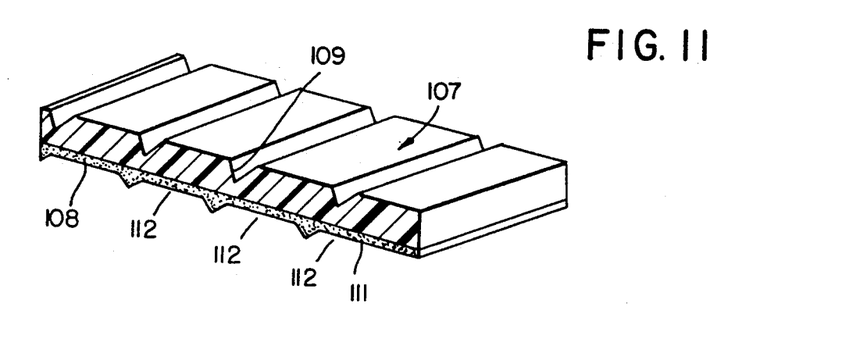
FIG. 11 is a perspective view of a conventional adhesive tape.
Figure 12:
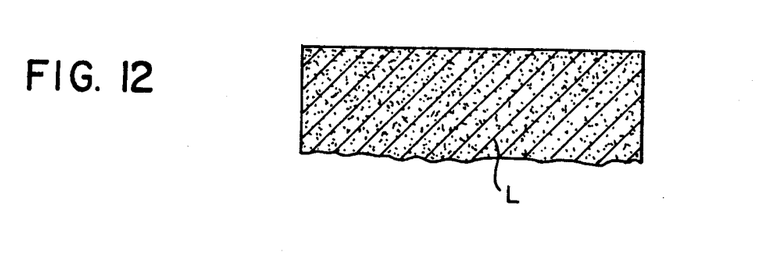
FIG. 12 is a plan view showing a trimmed line of a coating line when an adhesive tape of FIG. 11 is used.

(3) When utilizing the adhesive tape as a trimming tape for obtaining a distinct coating line, as shown in FIG. 11, a coating material permeates into recesses 112 of the adhesive layer 111 of the base film 107, and the coating line L cannot be finished distinctly as shown in FIG. 12. That is, the trimmed clearance of the coating is poor.

(4) Since the adhesive tape has an uneven rear surface, printing, stamping or writing on the rear surface cannot be made clearly. That is, the printability properties of the tape are poor.

(5) Since the rear surface of the adhesive tape is formed unevenly, light is reflected irregularly to cause poor transparency.

As a result of research by the inventors carried out to solve such properties as unwindability, adhesiveness, trimmed clearance, printability and transparency, the inventors have developed an adhesive tape comprising a polyolefin resin base film formed with a smooth surface on one side and an uneven surface on the other side, and an adhesive layer coated with an adhesive on said uneven surface.

With regard to the unwindability property of an adhesive tape, this characteristic is practically very important among the various characteristics exhibited by the adhesive tape.

In order to facilitate the unwindability of a tape and to increase the anchoring force of an adhesive, the surface wetting tension of the adhesive coated surface must be larger than that of the rear side.

Therefore, there are such means as coating an anchor coating agent on the adhesive coated surface or corona discharge processing in order to increase the difference of surface wetting tension, and further a method of coating a stripping agent on the rear side. Among them the corona discharge processing is the best, because it is inexpensive and suitable for mass production.

In economical corona discharge processing, though the processing roll and an electrode are maintained at a given interval and high voltage is applied to initiate the corona discharge while passing a plastic film therebetween, marks, stains and dust stuck to the processing roll may frequently cause corona discharge between the rear side of the base film and the processing roll. Since the rear side is also subjected to the corona discharge processing, the surface wetting tension of the rear surface may increase. That is, if the plastic film is not tightly contacted to the processing roll, the corona discharge is struck through it.

In the prior art, however, since the smooth surface must be processed by the corona discharge and the rear side is uneven, the rear side of the base film is not contacted to the processing roll tightly, thus the corona discharge is struck through and the surface wetting tension is increased. When the adhesive tape is produced by such a base film, its practical use may be hindered by poor unwindability and blocking which occurs.

SUMMARY OF THE INVENTION

According to the present invention, when the uneven surface of the base film is processed by the corona discharge, since the smooth surface of the rear side is contacted tightly to the processing roll, the corona discharge is not struck through, so that the rear side of the base film is not exposed to the corona discharge processing and an adhesive tape with good unwinding properties can be produced.

A significant feature of the present invention is that, as a result of research on preventing the corona discharge processing from striking through to improve the unwindability of the adhesive tape in use, an adhesive layer is provided by coating an adhesive on the uneven surface which is entirely different from the prior art. By this method, such properties as adhesiveness, trimmed clearance, printability and transparency which were problematic in the prior art have been improved unexpectedly.

That is, the present invention is directed to an adhesive tape comprising a polyolefin resin base film formed with a smooth surface on one side and an uneven surface on the other side, and an adhesive layer coated with an adhesive on the uneven surface. The present invention also includes an adhesive tape having a strong longitudinal tearing property, and comprising a base film made from a polyolefin resin formed on one side with a smooth surface pressed by a rubber roll, and on the other side with an uneven surface pressed by a drawing roll, and an adhesive layer coated with an adhesive on said uneven surface, the base film comprising a polyolefin resin having a specific melt index and/or the uneven surface having a specific shape.

DETAILED DESCRIPTION OF THE INVENTION

Figure 1:
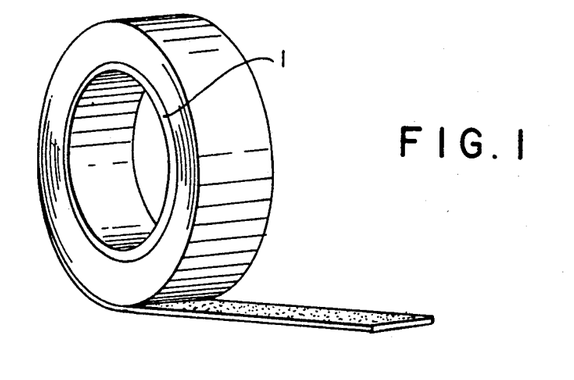
FIG. 1 is a perspective view of an adhesive tape rolled on a reel.

An adhesive tape of the present invention having good properties such as unwindability, adhesiveness, trimmed clearance, printability and transparency and which is capable of being rolled on a reel 1 is shown in FIG. 1.

Figure 2:
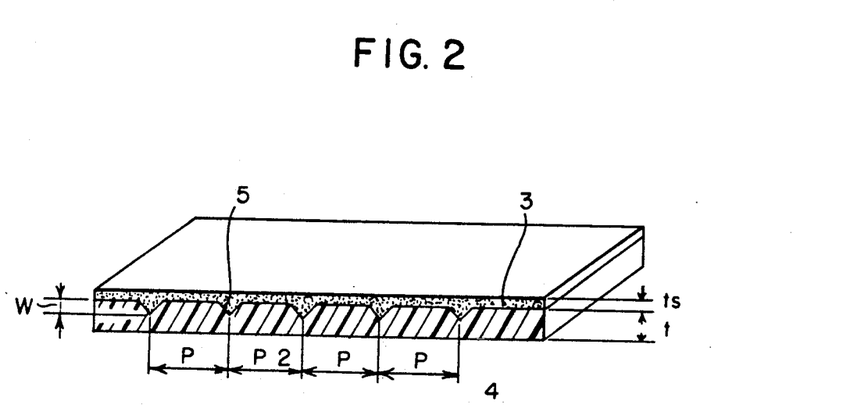
FIG. 2 is an enlarged perspective view of an adhesive tape.

FIG. 2 is an enlarged perspective view of the adhesive tape, wherein the numeral 2 indicates a base film and 3 denotes an adhesive layer. The base film 2 used may be formed on one side with a smooth surface 4 and the other side with an uneven surface 5.

Figure 3:
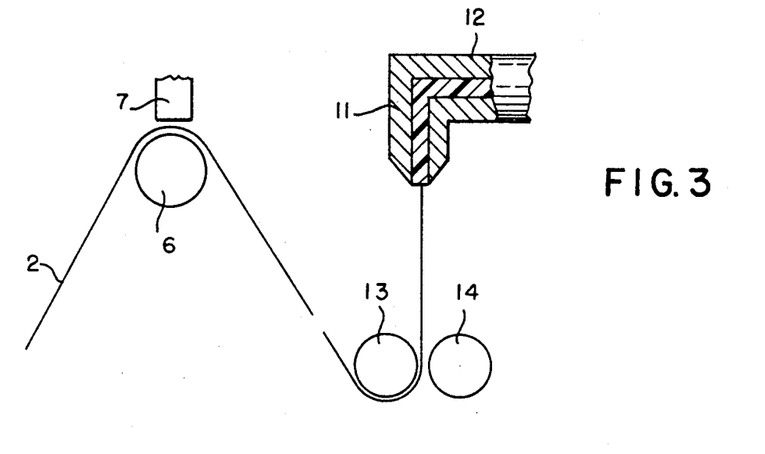
FIG. 3 is a front view illustrating production of a base film of an adhesive tape of the present invention.
Figure 4:
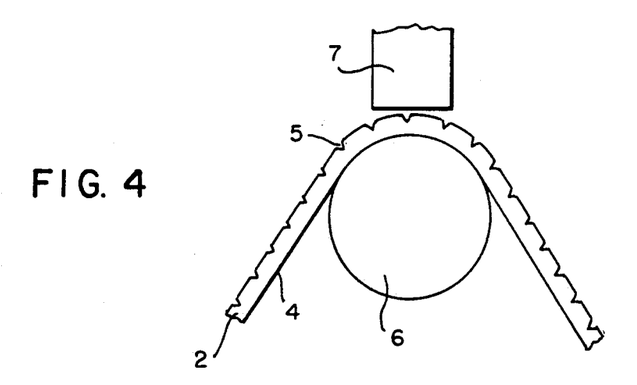
FIG. 4 is an enlarged front view of an essential portion of FIG. 3.

As shown in FIG. 3, the uneven surface is formed by extruding a molten polyolefin resin 11 by an extruding machine 12 into a sheet, which is then passed through a drawing roll 13 and a rubber roll 14 so as to be pressed against the former by the latter and transferred with an uneven pattern thereon. As shown in FIG. 2, the uneven pattern may be formed continuously by providing regular uneven parallel indents which cross the adhesive tape orthogonally with respect to its longitudinal direction to direct the hand cutting, in a predetermined interval P and depth W. Furthermore, a fine reticulated unevenness of about 60 to 250 meshes may be formed on the uneven surface. After forming the uneven surface with the drawing roll 13 and the rubber roll 14, the base film is passed through a processing roll 6 and an electrode 7 for corona discharge processing to facilitate anchoring of an adhesive on the uneven surface 5. At this time, as shown enlarged in FIG. 4, the uneven surface 5 of the base film 2 is positioned on the electrode 7 side and the smooth surface 5 thereof is contacting the processing roll 6.

Figure 5:
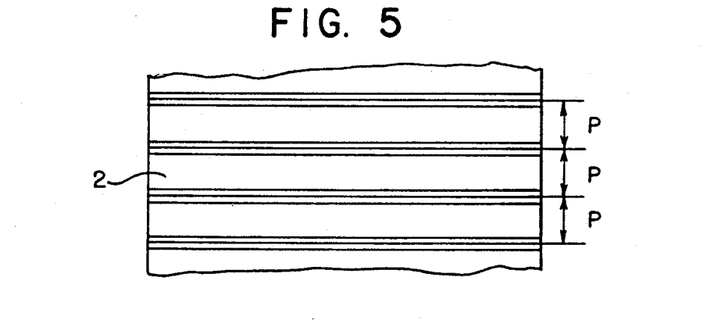
FIG. 5 is a plan view of a typical base film.
Figure 6:
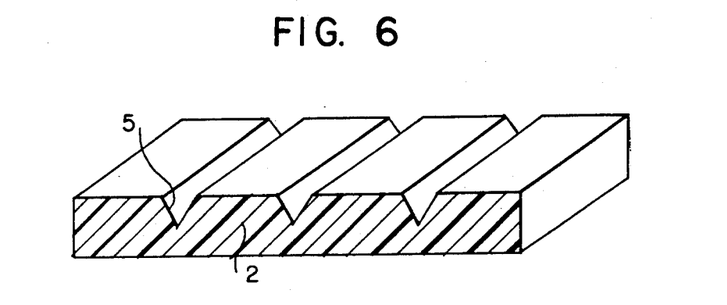
FIG. 6 is a perspective view of FIG. 5.
Figure 7:
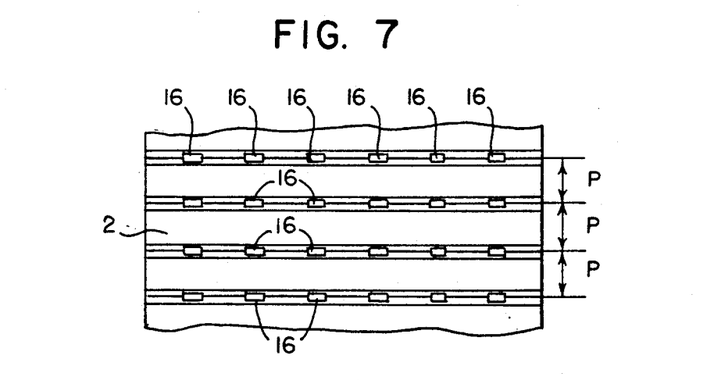
FIG. 7 is a plan view showing a state wherein a reinforcing bridge is provided on a base film.
Figure 8:
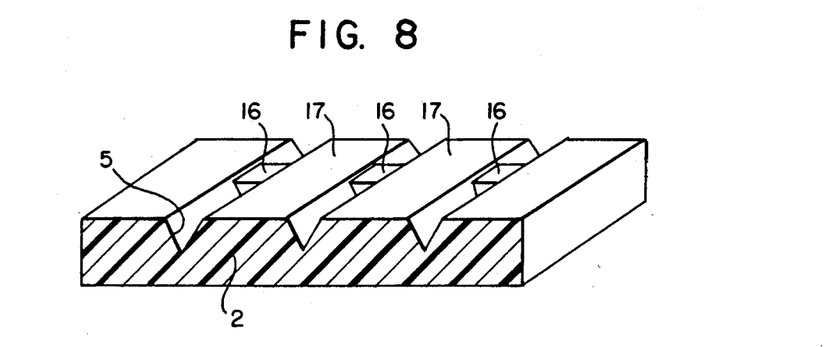
FIG. 8 is a perspective view of FIG. 7.

Though the base film 2 takes the form as shown in FIGS. 5 and 6, it may be provided with a reinforcing bridge 16 longitudinally as shown in FIGS. 7 and 8. Though the upper face of the reinforcing bridge 16 may be flush with the uneven projection 17 of the adhesive tape, it is preferably below the uneven projection 17 to provide for easy tearing or cutting of the adhesive tape by hand.

As polyolefin resins used in the present invention, polyethylene, polypropylene and copolymers of ethylene or propylene and other one or more kinds of alpha-olefins are exemplified. As alpha-olefins, ethylene, propylene, butene-1, pentene-1, hexene-1, heptene-1, octene-1, nonene-1, 4-methylpentene-1, decene-1, etc. are exemplified.

A molecular weight (related to melt index (Ml) of resins) of the polyolefin resin used in a polyolefin resin base film has some connection with strengthening the longitudinal tearing property of the adhesive tape, so that the melt index may be made smaller within a range in which the resin film can be processed, the range of melt index may be 0.2 to 20 g/10 min., and preferably 1.0 to 10.0 g/10 min.

In the present invention, as to the uneven surface of the polyolefin resin base film, the uneven depth W and interval P are related to the longitudinal tearing strength of the adhesive tape, so that the uneven depth may be 0.03–0.30 mm and preferably 0.04–0.12 mm. The longitudinal tearing strength may increase below 0.03 mm but the lateral tearing property may be deteriorated. Considering the ease of hand cutting the adhesive tape, the uneven interval (longitudinal interval of the adhesive tape) may be 0.5–5.0 mm and preferably 0.6–1.4 mm.

The surface wetting tension of the polyolefin resin base film used in the adhesive tape of the present invention is preferably 30 Dyn/cm or less on the smooth surface, and 35 Dyn/cm or more on the uneven surface. When the surface wetting tension of the smooth surface is more than 30 Dyn/cm, the adhesive tape wound in a roll is difficult to unwind, and moreover, unwanted blocking may occur, and when the surface wetting tension of the uneven surface is less than 35 Dyn/cm, anchoring of the adhesive on the uneven surface becomes insufficient.

Though the smooth surface 4 of the base film 2 is obtained by the rubber roll 14, a rubber roll which is as smooth as possible and preferably a silicon rubber roll may be used. Then, the uneven surface 5 of the base film 2 is processed by the corona discharge so as to facilitate anchoring of the adhesive and the adhesive layer 3 is laminated thereon. Any known adhesive may be used such as those in the groups of acryl, vinyl ether and silicon. Also, any laminating process may be employed such as a method of coating a solution or emulsion of an adhesive and drying or hot-melt coating. The adhesive tape in the present invention includes a two-layer construction comprising the base film 2 and the adhesive layer 3, the thickness t of the base film 2 is, though depending upon use, 30 to 500 $\mu$m and $t_1$ of the adhesive layer 3 is less than 300 $\mu$m from the uneven projection 17. Depending upon use of the adhesive tape, a coloring agent, filler and so on may be added to the respective layers.

Below, the present invention is specifically described in the following examples.

EXAMPLE 1, COMPARATIVE EXAMPLE 1, COMPARATIVE EXAMPLE 2

With respect to the adhesive tape of the present invention having a good unwinding property, adhesiveness and trimmed clearance:

A masterbatch of polyethylene containing calcium carbonate of 50% by weight was mixed with a polyethylene resin (d=0.96 g/cm$^3$: melt index of 7 g/10 min. at 190° C. and 2.16 kg/cm$^2$) such that the calcium carbonate content became 20% by weight to the total resin, and was extruded at 160°-190° C. to obtain a molten sheet. The molten sheet was pressed by a rubber roll so as to be formed with a smooth surface on one side, and by a drawing roll (a) (see Table 3) having a surface capable of forming an uneven surface on the other side, then the sheet was cooled and the uneven surface was processed by corona discharge at 45 Dyn/cm to obtain the base film for adhesive tape.

On the uneven surface of an uneven polyethylene film having the thickness of 130 μm, a 40 wt % solution (about 4000 centipoise) of a copolymer of butyl acrylate (80 wt %) and 2-ethylhexyl acrylate (20 wt %) in ethyl acetate-toluene mixed solvent was coated with a roll coater, and the coated film was passed through a drying oven at 80°-100° C. for 3 minutes to obtain the adhesive tape formed with an acryl adhesive layer of 30 μm thick on the polyethylene film.

In the comparative example 1, the smooth surface of the base film was processed by the corona discharge at 45 Dyn/cm by the same method as aforementioned, and coated with the adhesive to obtain the adhesive tape.

In the comparative example 2, the uneven surface of the 25 base film was processed by the corona discharge at 45 Dyn/cm by the same method as aforementioned except using a rubber roll with a coarse surface, and coated with the adhesive to obtain the adhesive tape.

Surface wetting tension of the smooth and uneven surfaces of the base film, and adhesiveness, unwinding property and trimmed clearance as a trimming tape of the adhesive tape are shown in Table 1. Bonding strength was tested by using stainless steel as a test plate at a peeling angle of 180° and peeling speed of 300 mm/min. Peeling force was tested by the same measuring method as the bonding strength except using a polyolefin film as a test plate. The surface wetting tension was measured according to JIS K6768.

As shown in Table 1, it is apparent that an adhesive tape of the present invention provided with an adhesive layer on the uneven surface of a base film, is superior to the conventional one provided with the adhesive layer on the smooth surface in many respects.

When the surface wetting tension of the smooth surface of the base film exceeds 30 Dyn/cm, the peeling strength is increased, namely, it is difficult to unwind and to use in practice. Besides, the bonding strength and the trimmed clearance as a trimming tape is deteriorated. It is also apparent regarding the adhesive tape of the present invention, that the insufficient smooth surface in the Comparative Examples results in a poor unwinding property, adhesiveness and trimmed clearance.

EXAMPLE 2, COMPARATIVE EXAMPLE 3

With respect to the adhesive tape of the present invention having a good unwinding property, adhesiveness, trimmed clearance, transparency and printability:

A mixture of an equal amount of polyethylene resin (1) (d=0.96 g/cm$^3$: melt index of 5 g/10 min. at 190° C. and 2.16 kg/cm$^2$) and polyethylene resin (2) (d=0.96 g/cm$^3$: melt index of 2 g/10 min. at 190° C. and 2.16 kg/cm$^2$) was extruded at 160° C.-190° C. to obtain a molten sheet. The molten sheet was pressed by a rubber roll to form a smooth surface on one side, and by a drawing roll (1) having the surface to form an uneven surface on the other side, then the sheet was cooled and the uneven surface was processed by corona discharge at 45 Dyn/cm to obtain the base film for adhesive tape.

On the uneven surface of an uneven polyethylene film having a thickness of 130 μm, a 40 wt % solution (about 4000 centipoise) of a copolymer of butyl acrylate (80 wt %) and 2-ethylhexyl acrylate (20 wt %) in ethyl acetate-toluene mixed solvent was coated with a roll coater, and the coated film was passed through a drying oven at 80°-100° C. for 3 minutes to obtain the adhesive tape formed with an acryl adhesive layer of 30 μm thick on the polyethylene film.

In comparative example (3), the smooth surface of the base film was processed by corona discharge at 45 Dyn/cm by the same method as aforementioned, and coated with the adhesive to obtain the adhesive tape.

The peeling property, adhesiveness, transparency, printability and the trimmed clearance as a trimming tape for the adhesive tape thus obtained are shown in Table 2.

TABLE 1

| | | Base film | | Adhesive Tape | | |
|---|---|---|---|---|---|---|
| | Contents | Surface wetting tension of uneven surface Dyn/cm | Surface wetting tension of smooth surface Dyn/cm | Bonding strength g/25 mm | Peeling strength g/25 mm | Trimmed clearance as trimming tape |
| Example 1 | Coated with the adhesive on the uneven surface | 45 | 30 or less | 1180 | 460 | good |
| Comparative example 1 | Coated with the adhesive on the smooth surface | 34 | 45 | 900 | 750 | poor |
| Comparative example 2 | Coated with the adhesive on the uneven surface, coarse smooth surface | 45 | 32-33 | 1000 | 700 | poor |

TABLE 2

| | Contents | Base Film Surface wetting tension of uneven surface Dyn/cm | Base Film Surface wetting tension of smooth surface Dyn/cm | Adhesive Tape Bonding strength g/25 mm | Adhesive Tape Peeling strength g/25 mm | Trimmed clearance trimming tape | *1 transparency (%) | *2 printability |
|---|---|---|---|---|---|---|---|---|
| Example 2 | Coated with the adhesive on the uneven surface | 45 | 30 or less | 1200 | 460 | good | 30 | good |
| Comparative example 3 | Coated with the adhesive on the smooth surface | 34 | 45 | 900 | 750 | poor | 54 | poor |

*1 Transparency: Measured by a haze meter
*2 Printability: Determined by printing condition exhibited using a water base stamp As shown in Table 2, it is apparent that the adhesive tape of the present invention provided with an adhesive layer on the uneven surface of the base film, is superior to the conventional one provided with an adhesive layer on the smooth surface of the base film in many respects.

EXAMPLES 3 AND 4

With respect to the adhesive tape of the present invention in which a longitudinal tearing strength is improved:

A masterbatch of polyethylene containing calcium carbonate of 50% by weight was mixed with a mixture of equal amount of polyethylene resin (1) ($d=0.96$ g/cm$^3$: melt index of 5 g/10 min. at 190° C. and 2.16 kg/cm$^2$) and polyethylene resin (2) ($d=0.92$ g/cm$^3$: melt index of 5 g/10 min. at 190° C. and 2.16 kg/cm$^2$) such that the calcium carbonate content became 10% by weight to the total resin, and extruded at 160°-190° C. to obtain a molten sheet. The molten sheet was pressed by a rubber roll to form a smooth surface on one side, and by drawing rolls (a), (b) having the surface to form an uneven surface on the other side, then the sheet was cooled and the uneven surface was processed by the corona discharge at 45 Dyn/cm to obtain the base film for adhesive tape having a thickness of 0.13 mm.

EXAMPLE 5

A masterbatch of polyethylene containing calcium carbonate of 50% by weight was mixed with a mixture of equal amount of polyethylene resin (1) ($d=0.96$ g/cm$^3$: melt index of 5 g/10 min. at 190° C. and 2.16 kg/cm$^2$ and polyethylene resin (3) ($d=0.92$ g/cm$^3$: melt index of 2 g/10 min. at 190° C. and 2.16 kg/cm$^2$) such that the calcium carbonate content became 10% by weight to the total resin, and extruded at 160° C.-190° C. to obtain a molten sheet.

The molten sheet was pressed by a rubber roll to form a smooth surface on one side and a drawing roll (a) having the surface to form an uneven surface on the other side, then the sheet was cooled and the uneven surface was processed by the corona discharge at 45 Dyn/cm to obtain the base film for adhesive tape having a thickness of 0.13 mm.

EXAMPLES 6 AND 7

A masterbatch of polyethylene containing calcium carbonate of 50% by weight was mixed with a mixture of equal amount of polyethylene resin (1) ($d=0.96$ g/cm$^3$: melt index of 5 g/10 min. at 190° C. and 2.16 kg/cm$^2$ and polyethylene resin (3) ($d=0.92$ g/cm$^3$: melt index of 2 g/10 min. at 190° C. and 2.16 kg/cm$^2$) such that the calcium carbonate content became 10% by weight to the total resin, and extruded at 190° C. to obtain a molten sheet.

The molten sheet was pressed by a rubber roll to form a smooth surface on one side, and by drawing rolls (a), (b) having the surface to form an uneven surface on the other side, then the sheet was cooled and the uneven surface was processed by the corona discharge at 45 Dyn/cm to obtain the base film for adhesive tape having a thickness of 0.13 mm.

COMPARATIVE EXAMPLE 4

A molten sheet was obtained by using the same polyethylene resins (1) and (2) and masterbatch as the examples 3, 4 and by the same extruding process.

The molten sheet was pressed by a rubber roll to form a smooth surface on one side, and by drawing roll (d) having the surface to form an uneven surface on the other side, the sheet was cooled and the uneven surface was processed by the corona discharge at 45 Dyn/cm to obtain the base film for adhesive tape having the thickness of 0.13 mm.

For the base film thus obtained, a lateral hand cutting strength and a longitudinal tearing strength of the adhesive tapes were measured, the results of which are shown in Table 3.

TABLE 3

| | Shape of drawing roll Type | Shape of drawing roll Uneven depth (mm) | Shape of drawing roll Uneven interval (mm) | MI of polyethylene resin $d=0.96$ g/cm$^3$ | MI of polyethylene resin $d=0.92$ g/cm$^3$ |
|---|---|---|---|---|---|
| Examples | | | | | |
| 3 | (a) | 0.12 | 1.2 | 5 | 5 |
| 4 | (b) | 0.08 | 1.2 | 5 | 5 |
| 5 | (a) | 0.12 | 1.2 | 5 | 2 |
| 6 | (b) | 0.08 | 1.2 | 5 | 2 |
| 7 | (c) | 0.04 | 1.2 | 5 | 2 |
| Comparative Example 4 | (d) | 0.14 | 0.4 | 5 | 5 |

| | Film thickness (mm) | Lateral hand cutting strength of film (kg)* | Longitudinal tearing strength of film (kg)* |
|---|---|---|---|
| Examples | | | |
| 3 | 0.13 | 0.19 | 0.70 |
| 4 | 0.13 | 0.30 | 0.97 |

TABLE 3-continued

| | | | |
|---|---|---|---|
| 5 | 0.13 | 0.25 | 0.92 |
| 6 | 0.13 | 0.35 | 1.22 |
| 7 | 0.13 | 0.38 | 1.67 |
| Comparative example 4 | 0.13 | 0.18 | 0.45 |

*Measured at 500 mm/min. according to Ermendorf Method.

Advantages of the Invention

According to the present invention, as described heretofore, by forming one side of a polyolefin resin base film into a smooth surface and the other side into an uneven surface, and coating an adhesive on the uneven surface to provide an adhesive layer, an adhesive tape having superb properties such as unwindability, adhesiveness, trimmed clearance, printability and transparency can be obtained without spoiling its lateral hand-cutting characteristics.

An adhesive tape obtained by the present invention can be broadly used, as an adhesive tape for trimming, for light-, medium-, and heavy-packaging and for temporary bonding.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adhesive tape, comprising:
a polyolefin resin base film having
   (i) a smooth surface which is not coated with a peeling agent on one side and,
   (ii) an uneven surface processed by corona discharge on the other side, wherein an adhesive layer coated with an adhesive agent is disposed on the uneven surface (ii) which was processed by corona discharge and wherein the corona discharge does not penetrate through to a reverse face of the adhesive tape,
wherein the uneven surface processed by corona discharge has an uneven depth of 0.03 to 0.30 mm and an uneven interval of 0.5 to 5.0 mm, and a surface wetting tension of the smooth surface of the polyolefin resin base film is less than 30 dyn/cm and that of the uneven surface processed by corona discharge is more than 35 dyn/cm.

2. The adhesive tape as claimed in claim 1, wherein a melt index of the polyolefin resin is 0.2 to 20 g/10 min.

* * * * *